United States Patent [19]

Ormachea

[11] Patent Number: 5,792,291
[45] Date of Patent: Aug. 11, 1998

[54] METHOD AND APPARATUS FOR CONTROLLING AN ASSEMBLY FOR BONDING A COVER MATERIAL TO FOAM

[75] Inventor: Raymond Joseph Ormachea, Warren, Mich.

[73] Assignee: Lear Corporation, Southfield, Mich.

[21] Appl. No.: 789,056

[22] Filed: Jan. 28, 1997

Related U.S. Application Data

[63] Continuation-in-part of Ser. No. 646,948, May 8, 1996.
[51] Int. Cl.⁶ .................................................. B32B 31/00
[52] U.S. Cl. .............................. 156/64; 156/214; 156/245; 156/286; 156/311; 156/358; 156/359; 156/366; 156/382; 156/498
[58] Field of Search .............................. 156/61, 212, 214, 156/245, 285, 286, 311, 350, 358, 359, 366, 378, 382, 498

[56] References Cited

U.S. PATENT DOCUMENTS

| | | | |
|---|---|---|---|
| 2,726,707 | 12/1955 | Wellons et al. | 156/366 X |
| 3,960,069 | 6/1976 | Bowyer | 156/359 X |
| 3,979,248 | 9/1976 | Kussmaul | 156/358 |
| 4,379,018 | 4/1983 | Griesdorn | 156/359 |
| 4,692,199 | 9/1987 | Kozlowski et al. | 156/245 |
| 5,372,668 | 12/1994 | Bracesco | 156/214 |

FOREIGN PATENT DOCUMENTS

| | | | |
|---|---|---|---|
| 555155 | 4/1958 | Canada | 156/366 |
| 3-101919 | 4/1991 | Japan | 156/350 |

OTHER PUBLICATIONS

"Hot Air Systems", Osram Sylvania, Inc., Product Marketing Bulletin, Nov. 23, 1994.
"Temperature Controller", GTE Sylvania, Instruction Manual, Nov. 1994.

*Primary Examiner*—David A. Simmons
*Assistant Examiner*—Paul M. Rivard
*Attorney, Agent, or Firm*—Howard & Howard

[57] ABSTRACT

A method and apparatus (84,94) for controlling an assembly for bonding a cover (22) over the undulating surface of a foam cushion (10) controls a tool actuator cylinder (80) to tilt a tool (18) to a loading position to permit placing the cover (22) and an adhesive layer (82) on the tool, tilts the tool to a working position to permit placing the cushion on the tool, controls a plate actuator cylinder (62) to lower and raise a compression plate (58) to force air from an interior of the cushion, controls a ram actuator cylinder (90) to lower a ram (14) to pierce the cushion with a plurality of hollow needles (44) attached to a plenum chamber, controls a heater (38) to heat compressed air and eject the hot air from the needles into the cushion to elevate the temperature of the cushion and melt the adhesive, and lowers and raises the compression plate to force hot air from the interior of the cushion to cure the adhesive and bond the cover to the cushion. Then the ram (14) is raised to extract the needles (44) from the cushion (10) as the compression plate (58) is maintained in place to hold the cushion and the cover (22) against the tool (18).

12 Claims, 11 Drawing Sheets

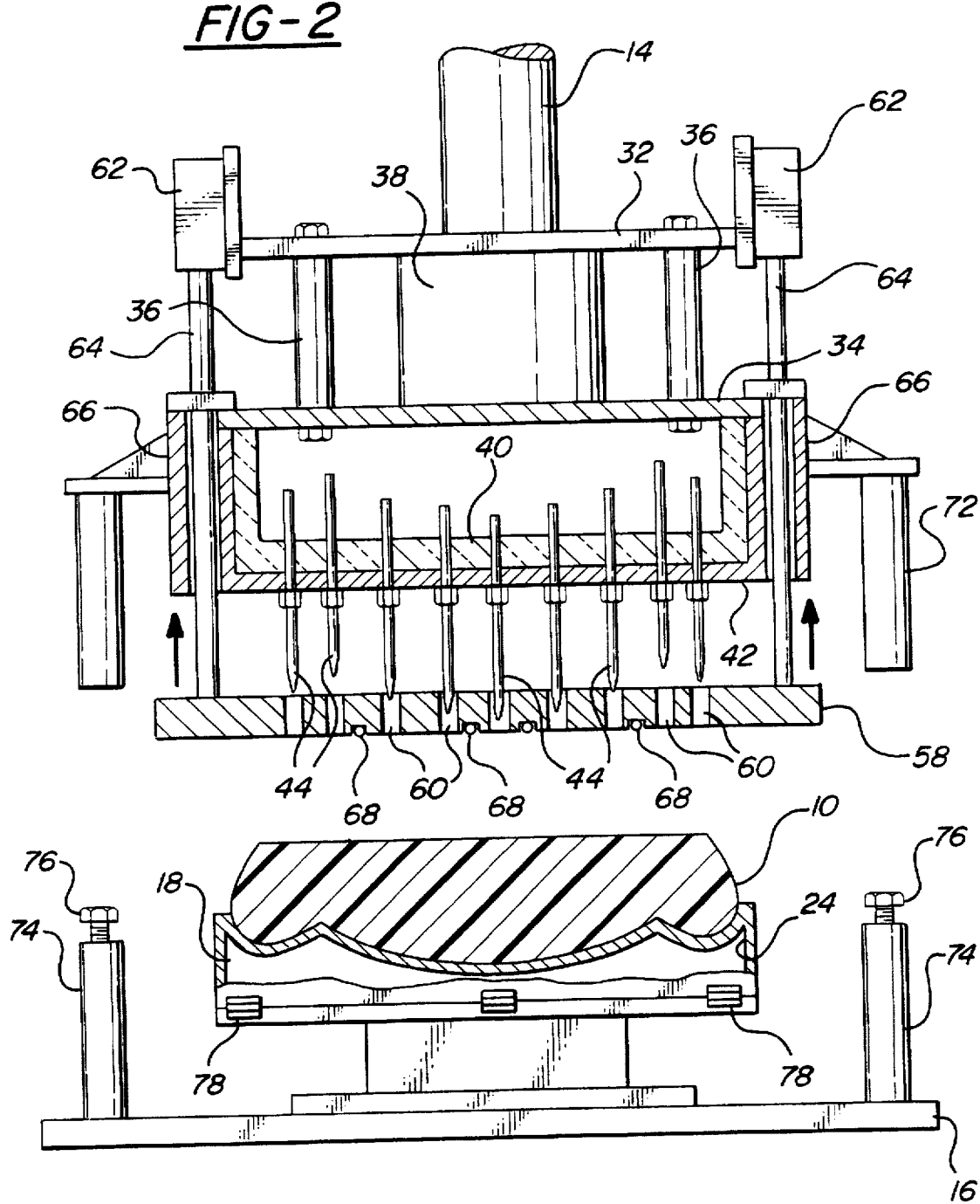

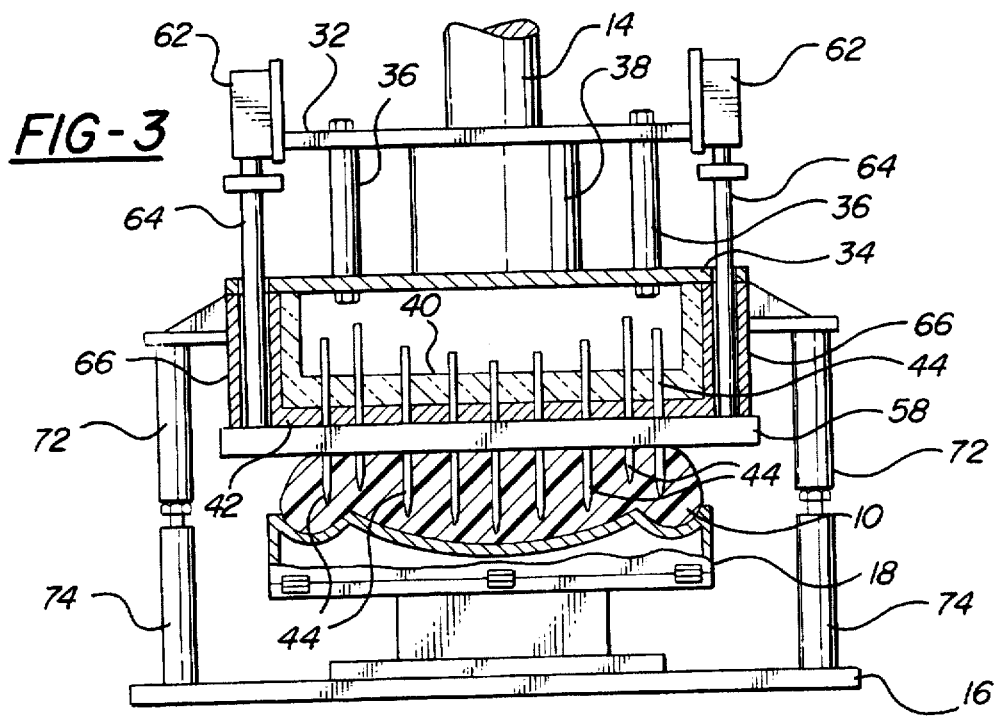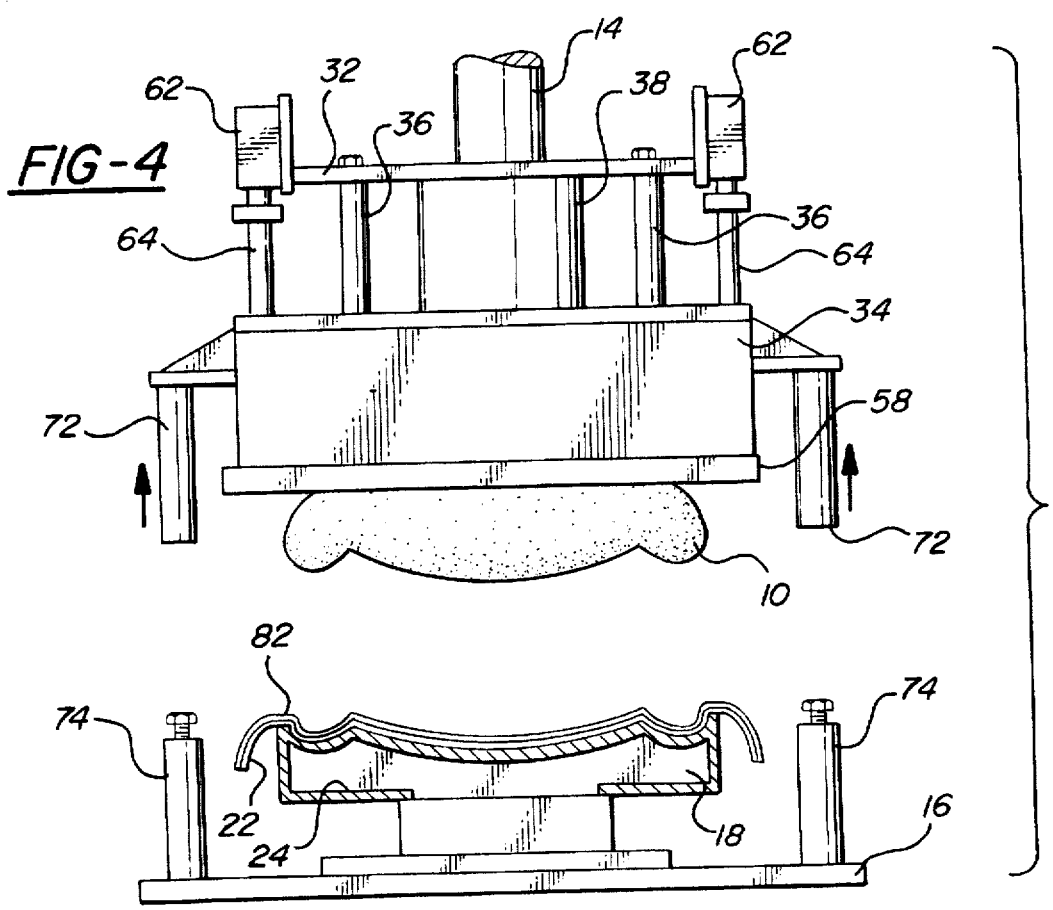

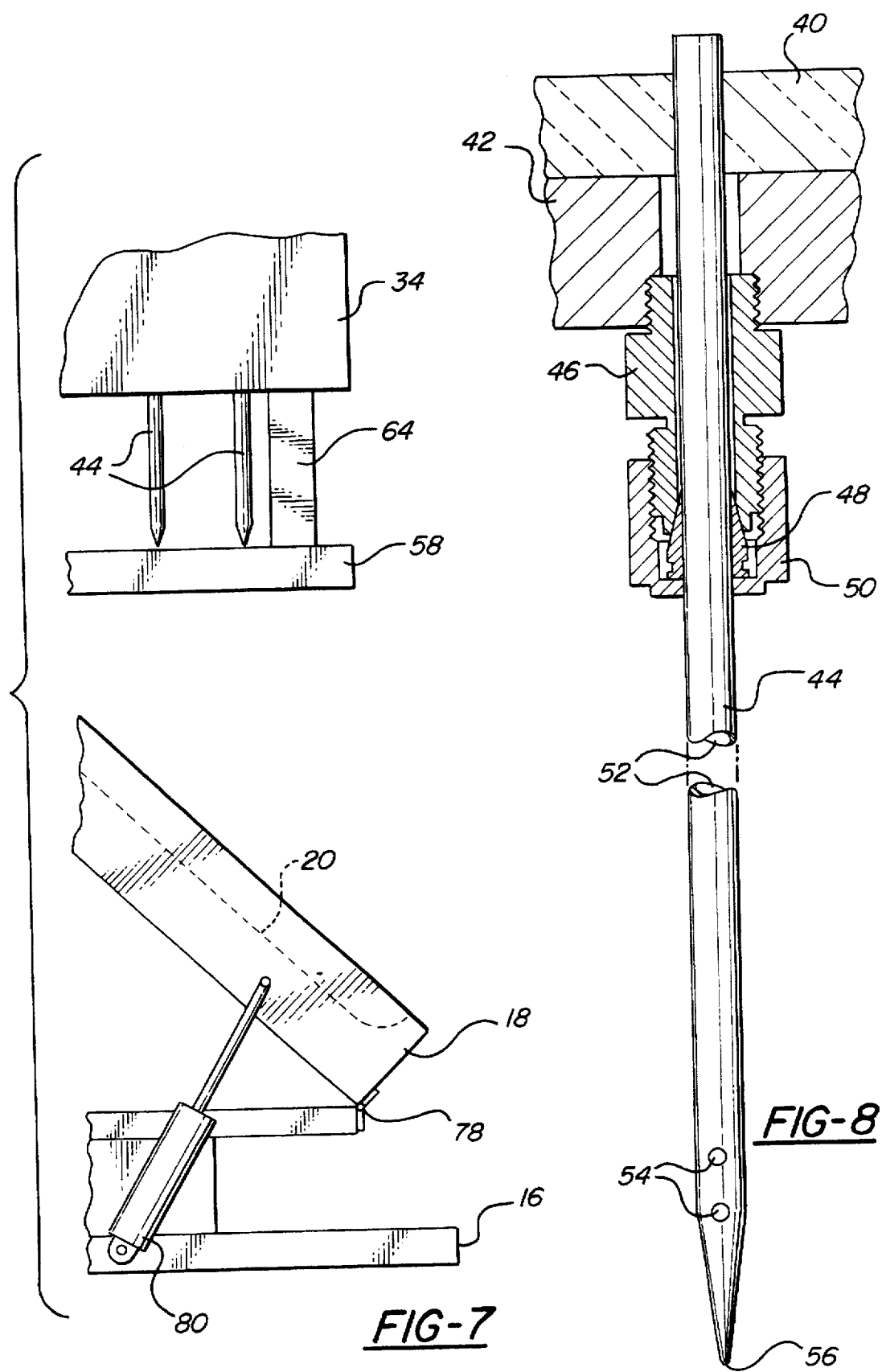

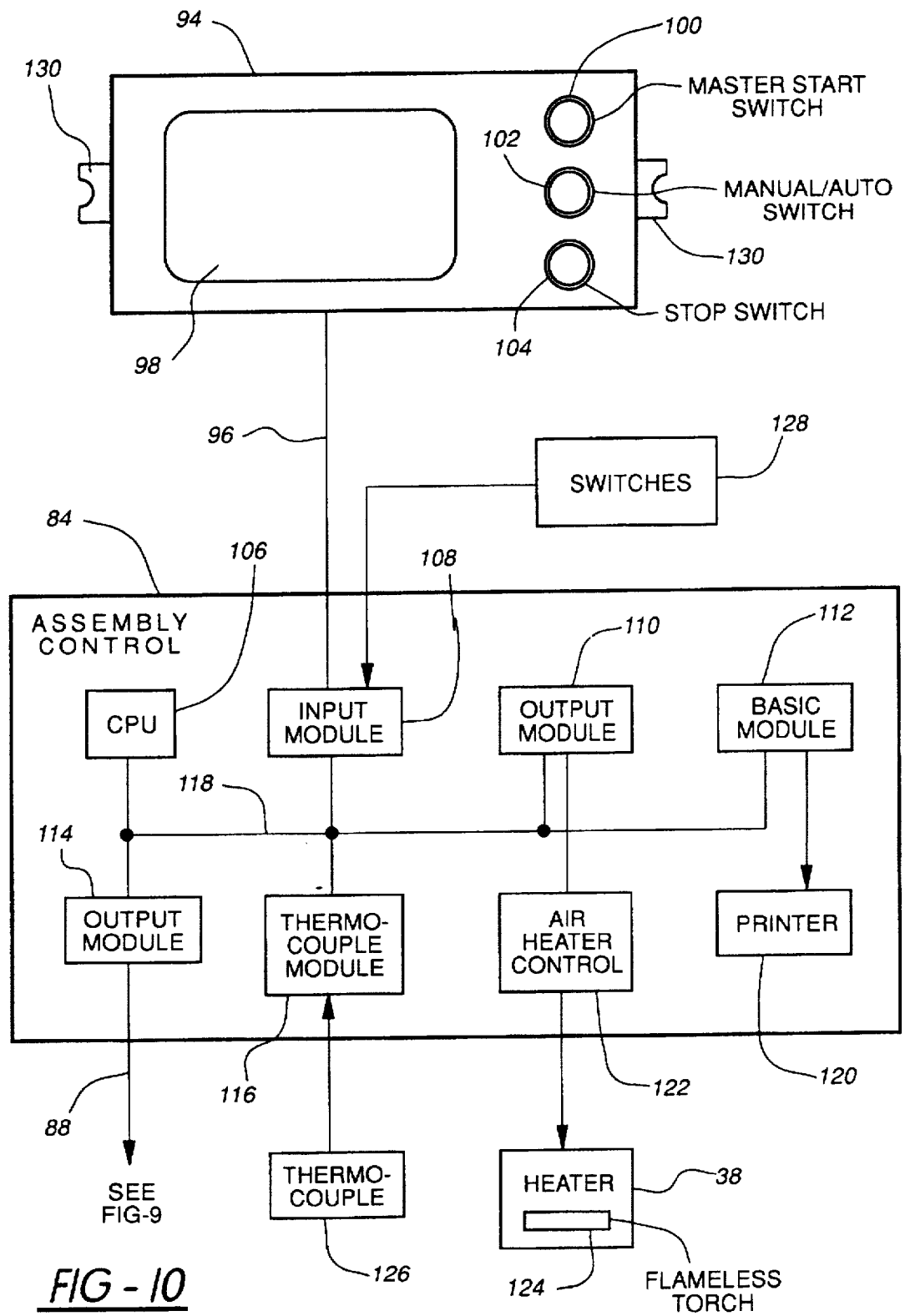

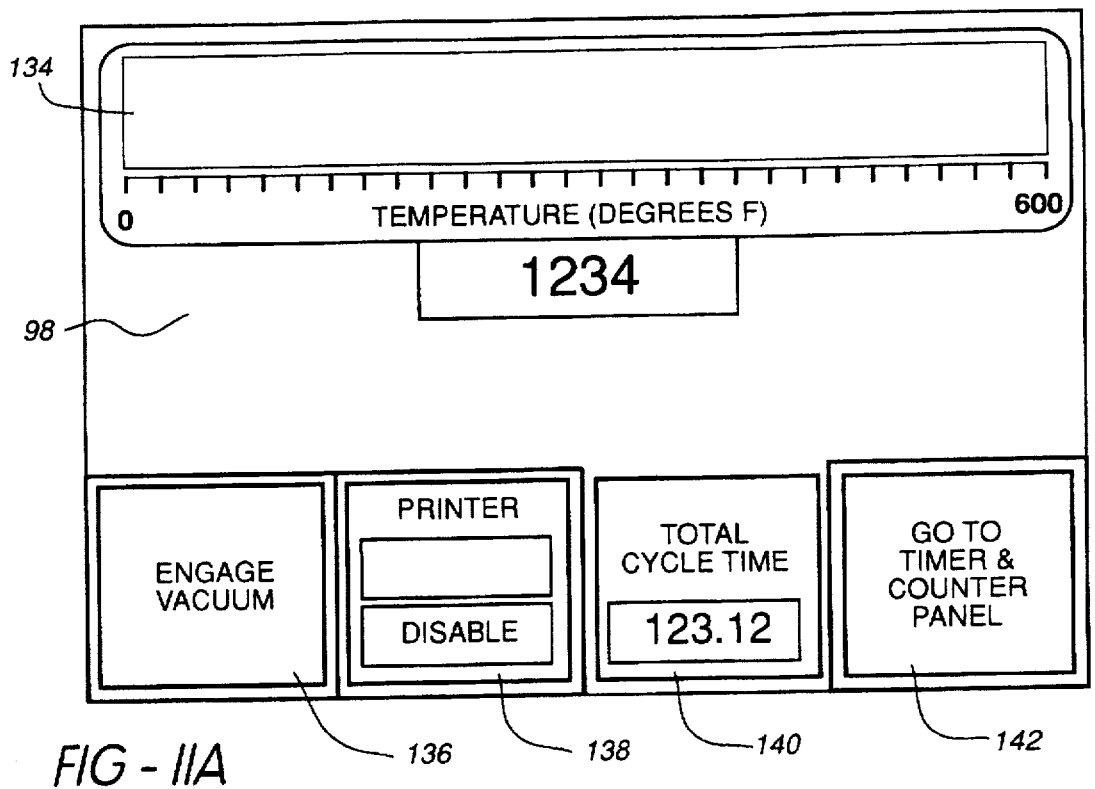
*FIG - IIA*
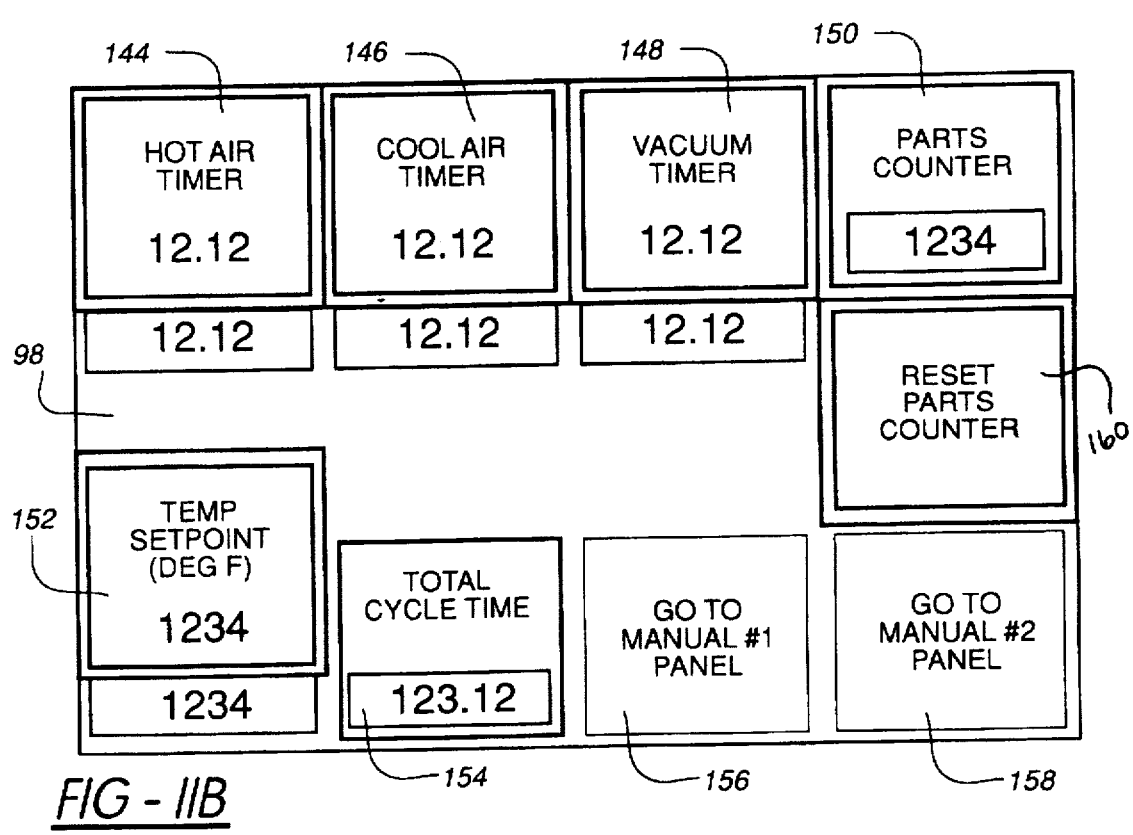
*FIG - IIB*

METHOD AND APPARATUS FOR CONTROLLING AN ASSEMBLY FOR BONDING A COVER MATERIAL TO FOAM

This is a continuation-in-part of copending application Ser. No. 08/646,948 filed on May 8, 1996, now pending.

BACKGROUND OF THE INVENTION

The present invention relates to the bonding of a cover to a cushion or pad of the type utilized in automotive seats, armrests, and the like, the cushion being formed of a material such as cellular foam, polyester or cut foam, and, in particular, to a method and an apparatus for controlling an assembly for performing such bonding.

A great deal of development activity has been expended to eliminate the labor intensive cut and sew methods of covering a foam cushion such as seat cushions in automotive seats. A particular segment of this development revolves around the bonding of the cover to the foam cushion.

One such method is disclosed in the U.S. Pat. No. 4,692,199 to Kozlowski et al. and assigned to the assignee of the subject invention. In accordance with the method disclosed therein, a vacuum is applied to the surface of a contoured tool or mold for drawing an impervious adhesive film against a cloth fabric layer to conform the cloth fabric layer to the contours of the tool surface. A foam cushion having a surface complementary to the tool is placed into mating engagement with the adhesive film as the film is held to the contour of the tool by the vacuum through the cloth layer. The foam cushion is held against the adhesive film, cloth layer and tool by a perforated platen and the vacuum is discontinued. Steam is then supplied through the tool to heat and melt the adhesive film for bonding the cloth layer to the foam cushion. A vacuum is then applied through the tool for removing moisture and curing the adhesive.

A modification of the above method is disclosed in the U.S. Pat. No. 5,372,668 to Bracesco wherein "the steam injection apparatus is associated with the upper mold rather than with the lower mold, . . . The upper mold is preferably provided with a plurality of cannulae which are able to pierce the foamed material constituting the padding body so as to provide a gripping action on the latter as well as the following injection of steam adjacent to the fabric." The lower mold or tool "has a greatly simplified structure" and merely applies a vacuum over the tool surface for drawing the cloth against the tool surface.

Although the known methods and apparatus are excellent for bonding a wide variety of cover materials to a foam cushion, there remain cover materials which can not be satisfactorily bonded to the foam cushion because their composition can not withstand the high temperatures and/or the moisture associated with these prior methods without unacceptable degradation.

SUMMARY OF THE INVENTION

The invention concerns an apparatus for controlling an assembly for bonding a cover of material over the surface of a foam cushion with an adhesive material. The assembly includes a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, a source of air in fluid communication with the plenum chamber, an air heater for heating the air, a pair of plate actuator cylinders attached to the ram, a compression plate positioned below the plenum chamber and attached to the plate actuator cylinders for vertical movement relative to the needles, a tool hingedly mounted on the support structure, a tool actuator cylinder attached to the support structure and the tool for tilting the tool between a working position and a loading position, and a vacuum source in fluid communication with the tool and the plenum chamber through a vacuum control.

The apparatus for controlling includes an operator control means having an output and being responsive to actuation by an operator for generating command signals at the output, a CPU module connected to a bus for generating bus signals, an input module connected to the bus and having an input connected to the operator control means output for receiving the command signals and sending the command signals to the CPU module over the bus, a thermocouple adapted to be mounted in a temperature sensing needle extending downwardly from the plenum chamber of the assembly for bonding for generating a feedback signal representing an actual temperature of air at a bond line between a cover and a cushion placed on the tool of the assembly for bonding, a thermocouple module connected to the bus and having an input connected to the thermocouple to receive the feedback signal and send the feedback signal to the CPU module over the bus, a heater control connected to the bus and having an output adapted to be connected to a heater of air from the source of air for generating a heater control signal for controlling the actual temperature of air in the plenum chamber, and an output module connected to the bus and having an output adapted to be connected to the ram actuator cylinder, the pair of plate actuator cylinders, the tool actuator cylinder and the vacuum control of the assembly for bonding, whereby the CPU module is responsive to the command signals and the feedback signal for generating bus signals over the bus to the heater control and to the output module, the heater control is responsive to the bus signals for generating the heater control signal and the output module is responsive to the bus signals for generating control signals at the output module output, the control signals including signals for controlling the ram actuator cylinder to raise and lower the plenum, the plate actuator cylinders to raise and lower the compression plate, the tool actuator cylinder to tilt the tool between a working position and a loading position and the vacuum control to supply vacuum to the tool and the plenum chamber thereby controlling the assembly for bonding to bond a cover to a cushion with an adhesive material.

The present invention also concerns a method of controlling a bonding assembly for bonding a cover layer of material over the surface of a foam cushion comprising the steps of: controlling a tool actuator cylinder to tilt a tool from a working position to a loading position while spreading a finished side of a cover over a working surface of the tool and placing an adhesive material on a backside of the cover; controlling a vacuum control to apply a vacuum pressure over the working surface of the tool to draw the cover against the working surface of the tool; controlling the tool actuator cylinder to return the tool to the working position after placing a foam cushion on the adhesive material; controlling a heater to heat air to a predetermined temperature range at which the adhesive material melts; and applying the heated air to an interior of the cushion to elevate a temperature of the cushion to melt the adhesive with the transfer of heat from the heated cushion and bond the cover to the cushion. The method further includes, prior to applying the heated air, controlling a ram actuator cylinder to move a plurality of hollow needles attached to a ram to pierce the cushion and wherein the step of applying the heated air is performed by forcing the heated air through the needles. The method also includes reading a feedback signal representing an actual temperature of the heated air at a bond line between the cushion and the cover and controlling the heater in response to a difference between the feedback signal and the predetermined temperature range, a step of controlling a plate actuator cylinder to move a compression plate against the cushion to force air from an interior of the cushion and a step of controlling a vacuum source to supply vacuum pressure to the needles to draw the heated air from the interior of the cushion to cure the adhesive material to thereby bond the cover to the cushion.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a fragmentary enlarged elevation view partially in cross section of the bonding assembly shown in the FIG. 1 showing a foam cushion on the tool and ready to be picked up by the needles;

FIG. 3 is a view similar to the FIG. 2 but showing the needles piercing the cushion for picking the cushion off the tool;

FIG. 4 is a view similar to the FIG. 3 but showing the cushion suspended in space above the tool and the tool loaded with a layer of cover material and a layer of adhesive material;

FIG. 7 is a fragmentary side elevation view showing the tool in a raised position for loading the cover and adhesive layers into the bonding assembly shown in the FIG. 1;

FIG. 8 is an enlarged view of a needle assembly utilized in the bonding assembly shown in the FIG. 1;

FIG. 10 is a schematic block diagram of the control system shown in the FIG. 9;

FIG. 11a through FIG. 11d are touch screen displays generated at the operator control panel shown in the FIG. 10;

DESCRIPTION OF THE PREFERRED EMBODIMENT

Figure 1:
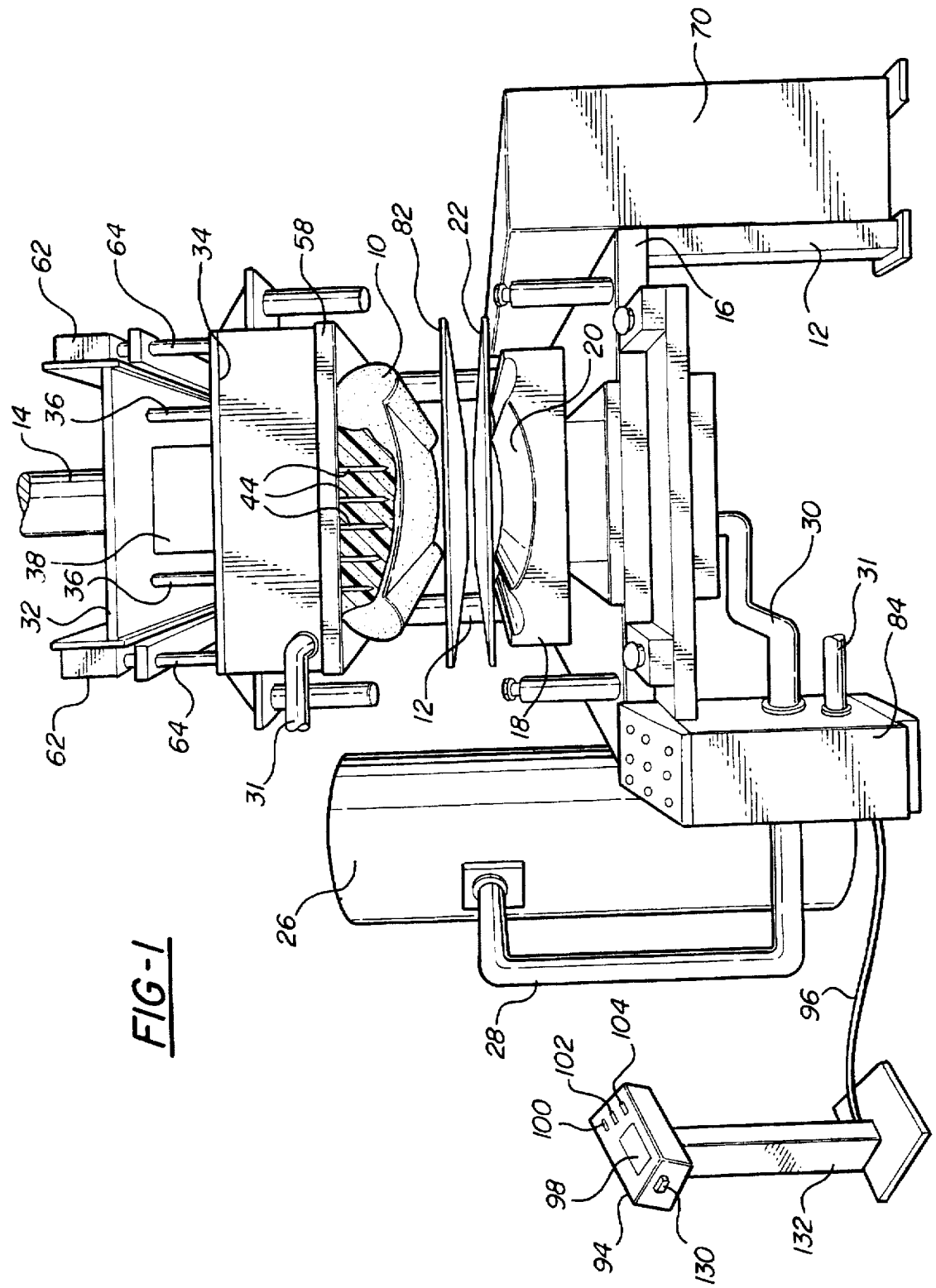
FIG. 1 is a perspective view of an embodiment of a bonding assembly showing a foam cushion retained on needles in spaced relationship to a tool and a film of adhesive and layer of cover material in exploded relationship with a control system constructed in accordance with the subject invention.

Referring to the Figures, wherein like numerals reference like or corresponding parts throughout the several views, an assembly for bonding a cover of material over the upper surface of a foam seat cushion 10 with an adhesive is generally shown in the FIG. 1. The assembly includes a support structure 12 for supporting a ram 14 and a base 16 of a press.

A tool or mold 18 is supported by the base 16 of the support structure 12 and presents an upper working surface 20 for receiving the finished side of a cover 22. The upper working surface 20 of the tool 18 includes passages or apertures for establishing fluid communication between the working surface and a hollow interior of the tool. The tool 18 defines an interior chamber 24 which is in fluid communication with a vacuum source 26 through a pair of lines 28 and 30. The tool 18 may also comprise a porous material through which fluids will flow.

The ram 14 is moved vertically by a pneumatic cylinder, or the like, to vertically position a horizontal support plate 32 attached to a lower end of the ram. A plenum chamber 34 is positioned below and is secured to the support plate 32 by tie rods 36 so that the plenum chamber is in a fixed spaced relationship to the support plate. A heater 38 is disposed between a top of the plenum 34 and a bottom of the plate 32 for heating compressed air and supplying the hot compressed air to the plenum. An insulating material 40 lines the interior walls of the plenum 34 to retain heat energy within the plenum, to minimize the transfer of heat energy to the surrounding environment.

The plenum 34 has a bottom wall 42 and an array of needles 44 extend through and are supported by the bottom wall. The needles 44 are, therefore, supported by the support structure 12 via the plenum 34, the tie rods 36, the support plate 32 and the ram 14. As shown in the FIG. 8, each needle 44 is adjustably supported through the bottom wall 42 by a coupling assembly which includes a fitting 46 threaded into a hole through the bottom wall with a conical collar 48 forced into radial gripping engagement with the needle body by a complementary tightening nut 50. The fitting 46, the collar 48 and the nut 50 comprise adjustment means for adjusting the distance each needle 44 extends from the bottom wall 42 of the plenum 34. Each of the needles 44 has a bore 52 formed therein for conveying heated fluid from the plenum 34 to injection ports 54 in the needles for heating the interior of the cushion 10. Each needle 44 also terminates in a lower pointed end 56 for piercing the cushion 10. The working surface 20 of the tool 18 undulates to complement the contour of the upper surface of the seat cushion 10 which is positioned upside down. Accordingly, the needles 44 extend various different distances from the bottom wall 42 whereby the lower pointed ends 56 of the needles are spaced substantially equal distances from the working surface 20 of the tool 18. All of the bores 52 in the needles 44 are of equal dimension and of equal length to equalize the various mass flow rates through all of the needles. In order to accomplish this feature, the needles 44 likewise extend into the plenum 34 various different distances. In this manner, equal amounts of heat are ejected from all of the needles 44 whereby the area of cushion 10 surrounding each needle is heated at the same rate and to the same degree as the areas surrounding all other needles.

The assembly is characterized by a compression plate 58 positioned below the plenum 34 and having holes or apertures 60 extending therethrough with each of the needles 44 extending through a corresponding one of the holes. A mounting mechanism comprising a pair of plate actuator cylinders 62 allows movement of the compression plate 58 relative to the needles 44 to hold the cushion 10 against the cover 22 and the tool 18 as the needles 44 are extracted from the cushion, as best illustrated in the FIG. 6. The actuators 62 are attached to opposite side edges of the support plate 32 and each has a pair of rods 64 extending downwardly through associated ones of a pair of guides 66 in the corners of the rectangular plenum 34. The rods 66 have lower ends attached to the compression plate 58 to support the compression plate under the bottom wall 42 for vertical movement relative to the plenum 34.

As shown in the FIG. 2, the compression plate 58 includes a plurality of tubes 68 defining passages for injecting cool fluid into the backside of the cushion 10. An ambient air cooler 70 (shown in the FIG. 1) is in fluid communication with the passages 68 for supplying cool air to the passages in the compression plate 58. The air cooler 70 cools ambient or the surrounding air to supply relatively cold air to the compression plate 58.

A plurality of upper stops 72 depend downwardly from side walls of the plenum 34 and are aligned with corresponding lower stops 74 which extend upwardly from the base 16 for limiting downward movement of the ram 14 to prevent the needles 44 from engaging the working surface 20 of the tool 18. Each of the lower stops 74 is provided with an adjusting screw 76 to adjust the stop position. As an alternative, the adjusting screws 76 can be eliminated and the lower stops can be vertically adjustable relative to the base 16. The lower ends of the upper stops 72 can be tapered or pointed and the upper end of each of the lower stops 74 can have a concave recess formed therein with a central aperture for receiving the pointed upper stop. Thus, these alternative stops are self aligning to precisely position the plenum chamber 34 relative to the tool 18.

Figure 6:
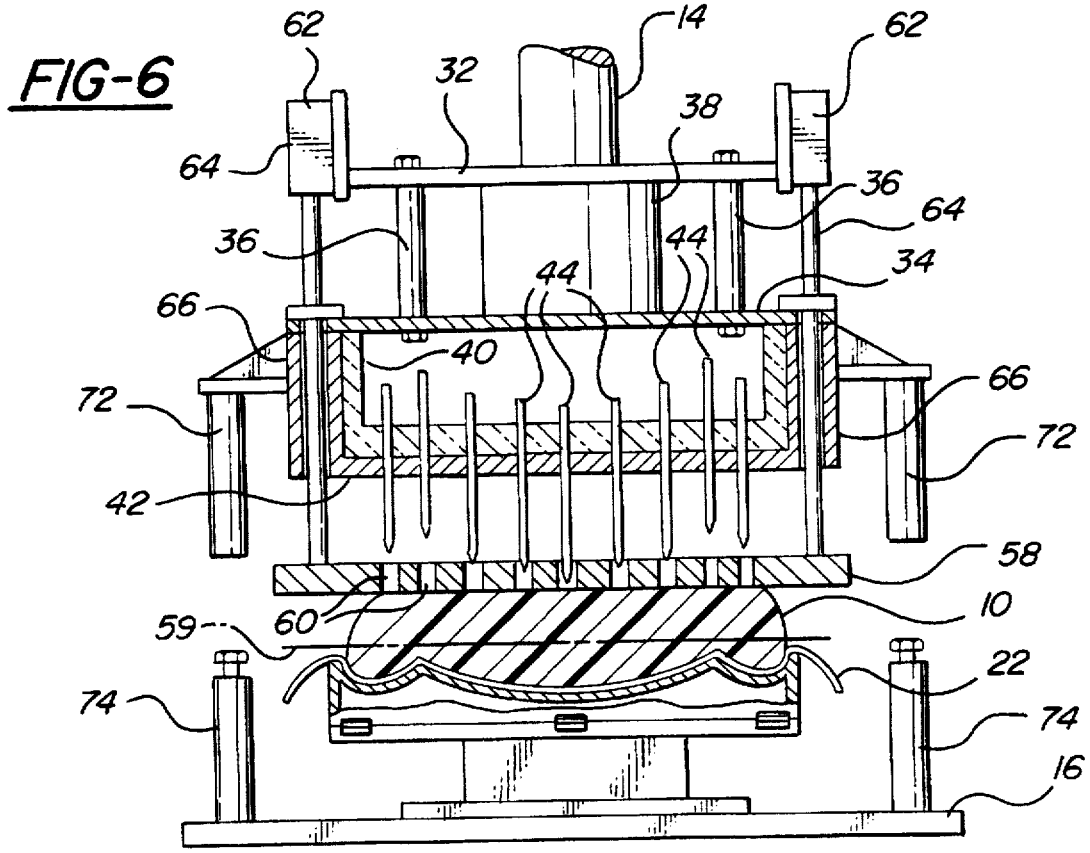
FIG. 6 is a view similar to the FIG. 5 but showing the needles extracted from the cushion as the cushion is held to the tool by the compression plate.

A tool support is included for moving the tool 18 back and forth between a working position beneath the needles 44, shown in the FIG. 1 through the FIG. 6, and a loading position with the working surface 20 thereof facing generally forwardly, as shown in the FIG. 7. The tool support comprises a plurality of hinges 78 interconnecting the tool 18 and the base 16, and an actuator 80 connected between the tool and the base for tilting the tool upwardly to an inclined and forwardly facing position shown in the FIG. 7. In the alternative, the tool 18 can be fixed relative to the base 16 and the base can be hinged to the support structure 12.

The cover layer of material 22 is bonded over the undulating upper surface of the foam cushion 10 in accordance with a method comprising a varying sequence of the steps, i.e., the steps may be sequential, simultaneous, or varying in order. For example, the method illustrated in the FIG. 2 includes the step of placing the foam cushion 10 having an undulating surface on the tool 18 having the working surface 20 conforming to the undulating surface of the cushion to be covered, followed by the step illustrated in the FIG. 3 of piercing the cushion with the plurality of needles 44 to varying depths in the cushion; however, the cushion may first be placed on a remote loading station (not shown) with the entire upper ram assembly being movable to pick up the cushion at the remote loading station and move the cushion back to the tool for bonding.

As shown in the FIG. 2, the compression plate 58 is in the lowered position, as at the end of a cycle, but is raised by the actuators 62 to engage or be next adjacent to the bottom wall 42 of the plenum 34 before the cushion 10 is placed upon the tool 18. The ram 14 is sequenced to lower the plenum 34 and the needles 44 so that the needles pierce the cushion 10, as shown in the FIG. 3, i.e., disposing the compression plate 58 with the holes 60 extending therethrough on the backside of the cushion with the needles extending through the holes. Thereafter, the ram 14 lifts the plenum 34 and the needles 44 to perform the step of lifting the cushion 10 from the tool 18 as the cushion is frictionally retained on the needles. As an alternative, the compression plate 58 can be maintained in the lowered position as the ram 14 lowers the plenum 34 and then raised relative to the plenum when within about one inch of the cushion 10 to protect an operator from the needles 44.

The heater 38 performs the steps of heating compressed air to a temperature approximately 150° F. to 160° F. and above the temperature of the cushion 10 and supplying that hot compressed air to the needles 44. The method includes the step of ejecting the hot compressed air from the needles 44 and into the cushion 10 to elevate the temperature of the cushion, while maintaining a substantially equal mass flow rate of hot air through each of the needles. Again, these steps may be performed remotely from the tool 18 as the tool is being loaded with the cover 22 and an adhesive.

The tool 18 is loaded with the cover 22 and the adhesive by first moving or pivoting the tool from the horizontal working position beneath the needles 44 to the loading position, as shown in the FIG. 7, with the working surface 20 thereof facing generally forwardly. In this forwardly inclined position, the tool 18 is out from under the needles 44 and more accessible to the operator for loading. While in this loading position, the operator performs the step of spreading the cover 22 over the working surface 20 of the tool 18 with the finished side of the cover facing the working surface. The finished side of the cover 22 is that side which will end up being the side presented to the vehicle interior. In the case of leather, it would be the treated and smooth side; in the case of velvet, it would be the felt side. The cover 22 can be an automotive grade fabric such as that available from Milliken™ or it may be laminated with a thin layer of foam such as that available from Foamex™ or it can be a tack sewn to a thin foam sheet.

The loading step further includes placing an adhesive 82 over the backside of the cover 22. As illustrated in the FIG. 1 and the FIG. 3, the adhesive 82 comprises a thin film which is impervious to air. Preferably, the film is clear so that the operator can see through the film to remove wrinkles in the cover layer 22. Alternatively, the adhesive may comprise a paste which is spread over the backside of the cover 22. The adhesive 82 melts at the low temperature recited above to cross-link or react and is available from Worthen Industries™ and may be available in the future from Bostik™. In any case, the method continues by applying a vacuum pressure over the working surface 20 of the tool 18 to draw the cover 22 against the working surface. The vacuum is created by the vacuum source 26 and is communicated through the fluid lines 28 and 30 to a plenum below the tool 18 and to the interior chamber 24. The vacuum is applied over the working surface 20 of the tool 18 through passages or apertures in the top wall of the tool, or through pores in the tool in the case of a porous tool. In the situation where the cover 22 is permeable to air flow, the adhesive 82 is an air impervious film to react with the vacuum applied thereto to pull the cover down against the working surface 20 of the tool 18. In the situation where the cover 22 is impervious to air, as in the case of leather, the adhesive 82 may be a paste or the equivalent as the vacuum reacts directly with the impervious cover. In either case, the cover 22 is made smooth and free of wrinkles over the working surface 20 of the tool 18 by the operator while under the influence of the vacuum.

Once the tool 18 is loaded with the cover 22 and the adhesive 82, the process continues by lowering the tool to the working position, as shown in the FIG. 4. The tool 18, or the entire base 16, is raised and lowered by actuation of the actuator 80 shown in the FIG. 7.

Figure 5:
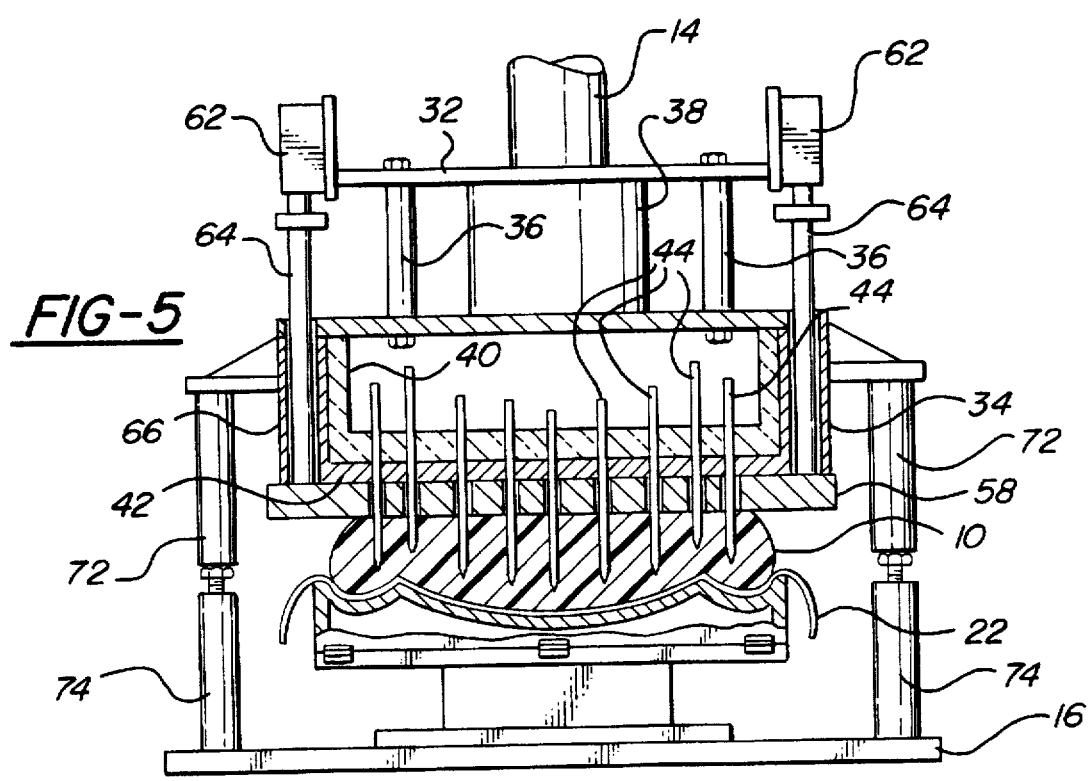
FIG. 5 is a view similar to the FIG. 4 but showing the heated cushion against the cover with the adhesive having been melted and diffused thereinto.

The method is characterized by preheating the cushion 10 to elevate the temperature of the cushion and thereafter moving the surface of the heated cushion to be covered against the adhesive 82 and the backside of the cover 22 to melt the adhesive with the transfer of heat from the heated cushion. This is accomplished by lowering the needles 44 with the cushion 10 thereon from the position shown in the FIG. 4 to the position shown in the FIG. 5 to place the undulating surface of the cushion against the adhesive 82 and the backside of the cover 22. This lowering is performed by the ram 14 and the stops 72, 74 and 76 are adjusted for preventing the needles 44 from contacting the tool working surface 20. The hot air has preheated the cushion 10 sufficiently to cause the melting of the adhesive 82 with the transfer of heat from the cushion. In fact, the cushion 10 is hot enough relative to the melting point of the adhesive 82 to cause the adhesive to melt in a very short time, that is, a short enough time period to prevent a quantity of heat transfer to the finished side of the cover 22 sufficient to cause degradation of the cover.

Relatively quickly, therefore, the ram 14 is actuated to perform the step of extracting the needles 44 from the cushion 10, the step shown in the FIG. 6. During this step the actuators 62 assure the holding of the compression plate 58 against the backside of the cushion 10 to hold the undulating surface of the cushion against the cover 22 and the tool 18 as the needles 44 are extracted. The cooler 70 continually operates for cooling ambient air to provide cool or cold air so that immediately upon the hot needles 44 being extracted from the cushion 10, cold air is ejected from the passages 68 in the compression plate 58 and into the cushion from the backside thereof to cure the adhesive 82 and bond the cover 22 to the cushion. Thereafter, the ram 14 is raised back to the position shown in the FIG. 1 and the cushion 10 with the cover 22 bonded thereto is removed from the tool 18. However, the cooler 70 can be eliminated for the cushions 10 in which the thickness renders such cooling ineffective.

As shown in the FIG. 1, the assembly includes a control panel 84 for sequencing the various steps. The control panel 84 may be utilized to manually sequence the steps by manual manipulation to perform each step as by pushing a button to execute the actuation of each of the ram 14, the actuators 62 and 80, the heater 38, the vacuum source 26, the cooler 70, etc. Alternatively, the controller 84 may be fully automatic to perform the steps in the desired sequence.

Figure 9:
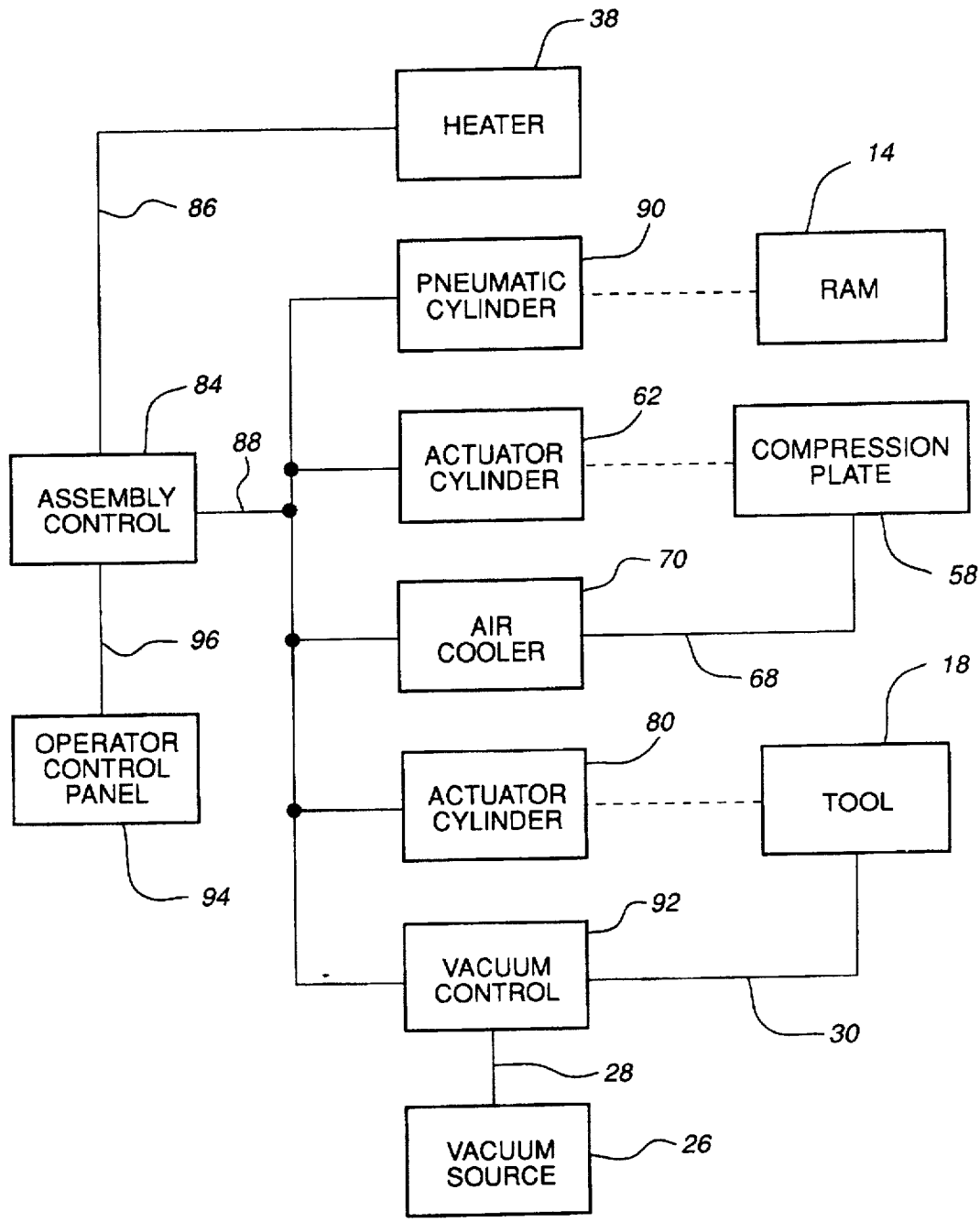
FIG. 9 is a schematic block diagram showing interconnections between the control system and the operating components of the bonding assembly shown in the FIG. 1.

As shown in the FIG. 9, the assembly control means 84 is connected to control a plurality of mechanisms in the bonding assembly. For example, the control means 84 is connected to the heater 38 by a heater signal line 86 for generating a heater control signal to control the temperature of the air in the plenum chamber 34. The control 84 also is connected to a control signal line 88 to generate various control signals to execute the actuation of each of the ram 14, the actuators 62 and 80, the vacuum source 26, the air cooler 70, etc. Accordingly, the line 88 is connected to a pneumatic cylinder 90 which is mechanically coupled to the ram 14. Thus, the control 84 generates control signals over the line 88 to cause the cylinder 90 to lower and raise the ram 14 and the attached plenum 34 during the bonding process. The line 88 is connected to the plate actuator cylinders 62 which are mechanically coupled to the compression plate 58 as described above. Thus, the control 84 generates control signals over the line 88 to cause the cylinders 62 raise and lower the plate 58 relative to the plenum 34 and the needles 44. The line 88 is connected to the air cooler 70 which is in fluid communication with the compression plate 58 via the tubes 68 as described above. Thus, the control 84 generates control signals over the line 88 to cause the air cooler 70 to cool ambient air and supply the cooled air to the plate 58. The line 88 also is connected to the tool actuator cylinder 80 which is mechanically coupled to the tool 18 as described above. Thus, the control 84 generates control signals over the line 88 to cause the cylinder 80 to tilt the tool 18 between the working position and the loading position. The vacuum source 26 is in fluid communication with a vacuum control 92 via the line 28 and the vacuum control is in fluid communication with the tool 18 via the line 30. Thus, the control 84 generates control signals over the line 88 to cause the vacuum control 92 to generate a vacuum in the vacuum source 26 and to connect the vacuum source to the tool 18. An operator control means such as an operator control panel 94 is connected to the control 84 by a line 96 for manual or automatic control of the bonding process. An operator inputs commands into the control panel 94 to generate command signals to the control means 84 over the line 96. Each of the actuator cylinders 62, 80 and 90 can be of any suitable type such as pneumatic, hydraulic and electric powered.

The control system for the bonding assembly is shown in more detail in the FIG. 10. The operator control panel 94 includes a touch screen 98 and three switches 100, 102 and 104 for use by an operator in controlling the bonding assembly during the bonding process. The touch screen 98 is a model QUICKPANELjr. available from Total Control Products, Inc. of Melrose Park, IL for displaying information and providing softkeys. The switch 100 is a master start switch which the operator actuates to activate the control system. The switch 102 is a manual/auto switch which permits the operator to select manual or automatic operation of the bonding assembly. The switch 104 is a stop switch which the operator can actuate to stop the operation of the bonding assembly.

The assembly control 84 includes a programmable controller of the SLC-500 type available from Allen Bradley. The touch screen 98 and the switches 100, 102 and 104 are connected to the control 84 by the line 96 which includes a 1747-PIC interface converter and a 1747-AIC link coupler available from Allen Bradley at each end thereof. The control 84 includes an SLC 5/03 CPU module 106, a 1746-IA16 input module 108, 1746-NO4I analog current output module 110, a 1746-BAS Basic language module 112, a 1746-OW16 output module 114 and a 1746-NT4 thermocouple module 116 all available from Allen Bradley. The modules 106 through 116 can be installed in a 1746-A7 7-slot rack with a 1746-P1 power supply also available from Allen Bradley. The modules are connected to a bus 118 for communication of signals and information related to the operation of the bonding assembly.

Also included in the control 84 is a printer 120 and an air heater control 122. The printer 120 is a model 6710 Digitec connected to an output of the Basic language module 112 for printing reports of information gathered during the bonding process. The air heater control 122 has an input connected to an output of the output module 110 and an output connected to an input of the heater 38. The air heater control 122 and a flameless torch 124 in the heater 38 are components of a Series 68 flameless torch system available from Therme, Inc. of Wilmington, Del. The air heater control 122 generates the heater control signal which regulates the temperature of the flameless torch 124 in the heater 38 in response to a feedback signal from a thermocouple 126 connected to an input of the thermocouple module 116. The thermocouple 126 is a type J thermocouple probe available from Omega Engineering, Inc. and is mounted in the plenum chamber 34 to monitor the actual temperature of the heated air being supplied to the needles 44. The output module 88 is connected by the line 88 to generate control signals to the pneumatic cylinder 90, the actuators 62 and 80, the vacuum control 92 and the air cooler 70 shown in the FIG. 9. The input module 108 is connected to a plurality of switches 128 which sense various operations of the bonding assembly such as the position of a safety gate (not shown), the tilt of the tool 18, the position of the compression plate 58 and the position of the ram 14 and generate corresponding switch signals. The input module 108 also receives cycle start signals over the line 96 generated by actuation of a pair of cycle start buttons 130 in the form of optical touch switches mounted on opposite sides of the control panel 94. The CPU module 106 is programmed to respond to the signals input from the control panel 94, the thermocouple 126 and the switches 128 and to generate the appropriate bus signals on the bus 118 to generate control signals on the line 88 through the output module 114, to control the operation of the printer 120 and to control the operation of the air heater control 122. Of course, in the FIG. 9 and the FIG. 10, any of the lines for carrying electrical signals can be of the single conductor type for serial communication or of the multiple conductor type for parallel communication depending upon the inputs and outputs to which such lines are connected.

The control system according to the present invention operates in an automatic mode selected through operator actuation of the switch 102 on the control panel 94. The operator actuates the switch 100 to activate the control system. As shown in the FIG. 2, the pneumatic cylinder 90 is actuated to place the ram 14 in the raised position so that the operator can place the foam cushion 10 on the working surface 20 of the tool 18. Furthermore, the compression plate 58 is raised by the plate actuators 62 to engage or be next adjacent to the bottom wall 42 of the plenum 34 before the cushion 10 is placed upon the tool 18. The operator then closes a safety door or gate (not shown) and presses the cycle start buttons 130. The control system lowers the support plate 32 and plenum 34, as shown in the FIG. 3, causing piercing of the cushion 10 with the plurality of needles 44. Thereafter, the ram 14 lifts the plenum 34 and the needles 44 to raise the cushion 10 from the tool 18 as the cushion is frictionally retained on the needles. The operator opens the safety door and the tool 18 is tilted automatically to the loading position shown in the FIG. 7.

The operator loads the cover 22 onto the working surface 20, turns on the vacuum control 92, loads the adhesive material 82 and makes any final adjustments to the position of the cover. The operator presses the cycle start buttons 130 which lowers the tool 18 to the horizontal working position. The operator closes the safety gate and the control system automatically lowers the plenum 34, as shown in the FIG. 5, and turns on the hot air for a predetermined variable time period. The flameless torch 124 in the heater 38 heats air to a temperature approximately 150° F. to 160° F. and that heated air is supplied to the needles 44 to soften the adhesive material 82. Then the control system applies the cool air for an adhesive solidification predetermined variable time period. During this time, vacuum pressure is applied over the working surface 20 of the tool 18 to draw the cover 22 against the working surface. The vacuum is created by the vacuum source 26 and is communicated through the fluid lines 28 and 30 to a plenum (not shown) below the tool 18 which is in fluid communication with the interior chamber 24 of the tool. The vacuum is applied over the working surface 20 of the tool 18 through passages or apertures in the top wall of the tool, or through pores in the tool in the case of a porous tool. In the situation where the cover 22 is permeable to air flow, the adhesive material 82 is an air impervious film to react with the vacuum applied thereto to pull the cover down against the working surface 20 of the tool 18. In the situation where the cover 22 is impervious to air, as in the case of leather, the adhesive material 82 may be a paste or the equivalent as the vacuum reacts directly with the impervious cover. In either case, the cover 22 is made smooth and free of wrinkles over the working surface 20 of the tool 18 by the operator while under the influence of the vacuum.

At the end of the solidification period, the plenum 34 is raised while the compression plate 58 is lowered to remove the cushion from the needles 44. Relatively quickly, therefore, the ram 14 is actuated to perform the step of extracting the needles 44 from the cushion 10, as shown in the FIG. 6. During this step, the actuators 62 assure the holding of the compression plate 58 against the backside of the cushion 10 to hold the undulating surface of the cushion against the cover 22 and the tool 18 as the needles 44 are extracted. The air cooler 70 continually operates for cooling ambient air to provide cool or cold air so that immediately upon the hot needles 44 being extracted from the cushion 10, cold air is ejected from the passages 68 in the compression plate 58 and into the cushion from the backside thereof to cure the adhesive and bond the cover 22 to the cushion. Then, the compression plate 58 is raised back to the position shown in the FIG. 1 and the cushion 10 with the cover 22 bonded thereto is removed from the tool 18 by the operator after the safety gate has been opened. The bonding cycle is complete and the bonding assembly and the control system are ready to repeat the cycle.

As shown in the FIG. 1, the operator control panel 94 is mounted in an enclosure at the top of a floor engaging pedestal 132 which pedestal can be positioned adjacent to the bonding assembly for convenient access by the operator. The touch screen 98 and the push buttons 100, 102 and 104 are mounted on a surface of the panel 94 tilted upwardly from horizontal for ease of viewing. The cycle start buttons 130 (only one is shown) are mounted on opposite sides of the panel enclosure. The cable 96 extends from a base of the pedestal 132 to the control 84. There are shown in the FIG. 11a through the FIG. 11d touch screen displays generated by the operator control panel 94 shown in the FIG. 10. In the FIG. 11a, the touch screen 98 is configured as an Auto Vacuum panel display having a temperature bar graph display 134 extending horizontally across an upper portion thereof with a digital temperature box directly below the bar graph for indicating the hot air temperature. Extending across the bottom of the Auto Vacuum panel display are a vacuum push button softkey 136, a printer selector switch softkey 138, a total cycle time display 140 a change panel push button softkey 142. The operator uses the vacuum softkey 136 to turn on the vacuum control 92 which changes the softkey display from ENGAGE VACUUM, as shown, to VACUUM ENGAGED. Actuation of the printer softkey 138 alternately illuminates the ENABLE and DISABLE displays and turns the printer 120 on and off. The display 140 shows the total cycle time in seconds. The change softkey 142 switches the display on the touch screen 98 to a Timer & Counter panel display as shown in the FIG. 11b.

The Timer & Counter panel display in the FIG. 11b has a hot air timer push button softkey 144, a cool air timer push button softkey 146, a vacuum timer push button softkey 148, and a parts counter display 150 extending across a top portion thereof. A temperature setpoint push button softkey 152, a total cycle time display 154, a first change panel push button softkey 156, and a second change panel push button softkey 158 extend across a bottom portion of the Timer & Counter panel display. A reset parts counter push button softkey 160 is positioned between the softkeys 150 and 158. The hot air timer push button softkey 144 permits the operator to set an "on time" for the hot air and the value of the "on time" is displayed in a lower portion of the softkey. Below the softkey 144 is a digital display of the actual elapsed hot air "on time". The cool air timer push button softkey 146 permits the operator to set an "on time" for the cool air and the value of the "on time" is displayed in a lower portion of the softkey. Below the softkey 146 is a digital display of the actual elapsed cool air "on time". The vacuum timer push button softkey 148 permits the operator to set an "on time" for the vacuum to the tool 18 and the value of the "on time" is displayed in a lower portion of the softkey. Below the softkey 148 is a digital display of the actual elapsed cool air "on time". The display 150 indicates the total number of cushions 10 which have been processed through the bonding assembly and the reset softkey 160 permits the operator to reset the count total to zero.

The temperature setpoint push button softkey 152 permits the operator to set the hot air temperature and the value of the setpoint temperature is displayed in a lower portion of the softkey. The CPU 106 responds to the setpoint temperature command signal by generating control signals to the air heater control 122. Below the softkey 152 is a digital display of the actual temperature, as measured by the thermocouple 126. The total cycle time display 154 is the same as the display 140 shown in the FIG. 11a. The first change panel push button softkey 156 permits the operator to switch the display to the Manual #1 panel display shown in the FIG. 11c and the second change panel push button softkey 158 permits the operator to switch the display to the Manual #2 panel display shown in the FIG. 11d.

Figure 11C:
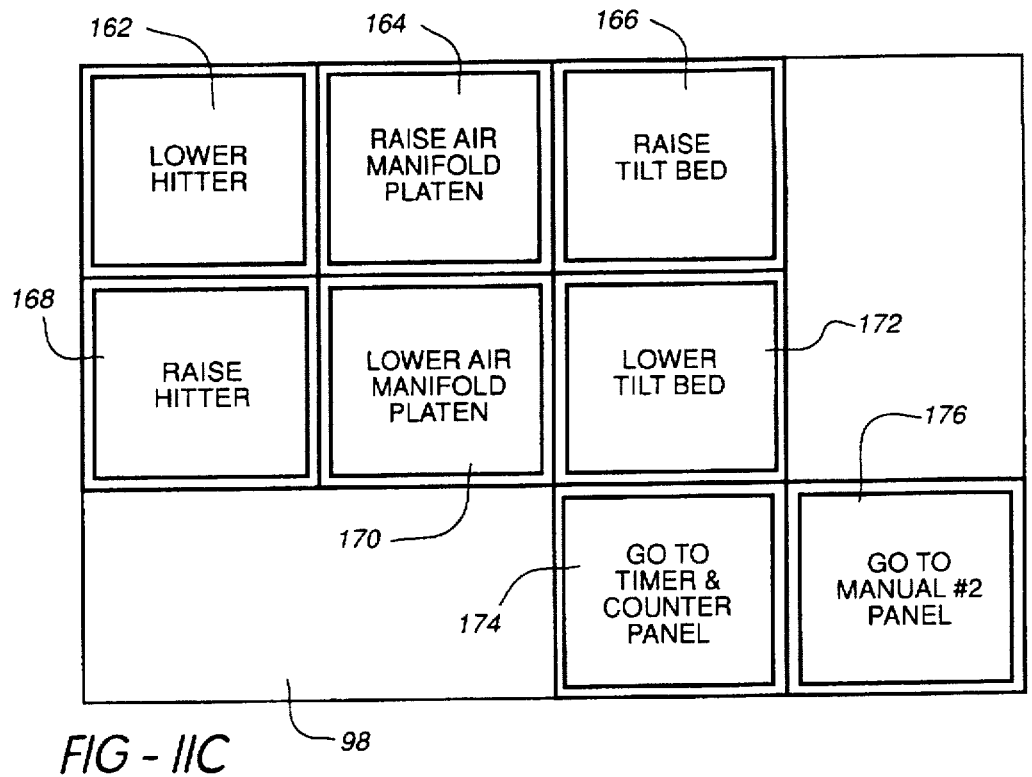

The Manual #1 panel display in the FIG. 11c has a lower hitter push button softkey 162, a raise air manifold platen push button softkey 164 and a raise tilt bed push button softkey 166 displayed in a top portion thereof. A raise hitter push button softkey 168, a lower air manifold platen push button softkey 170 and a lower tilt bed push button softkey 172 are displayed in a middle portion thereof. A first change panel push button softkey 174 and a second change panel push button softkey 176 are positioned in a bottom portion of the panel display. The softkeys 162 and 168 are used by the operator to manually control the actuator cylinders 62 to lower and raise respectively the compression plate 58. The softkeys 164 and 170 are used by the operator to manually control the pneumatic cylinder 90 to raise and lower respectively the ram 14 and the attached plenum 34. The softkeys 166 and 172 are used by the operator to manually control the actuator 80 to raise and lower respectively the tool 18. The first change panel push button softkey 174 permits the operator to switch the display to the Auto Vacuum panel display shown in the FIG. 11a and the second change panel push button softkey 176 permits the operator to switch the display to the Manual #2 panel display shown in the FIG. 11d.

Figure 11D:
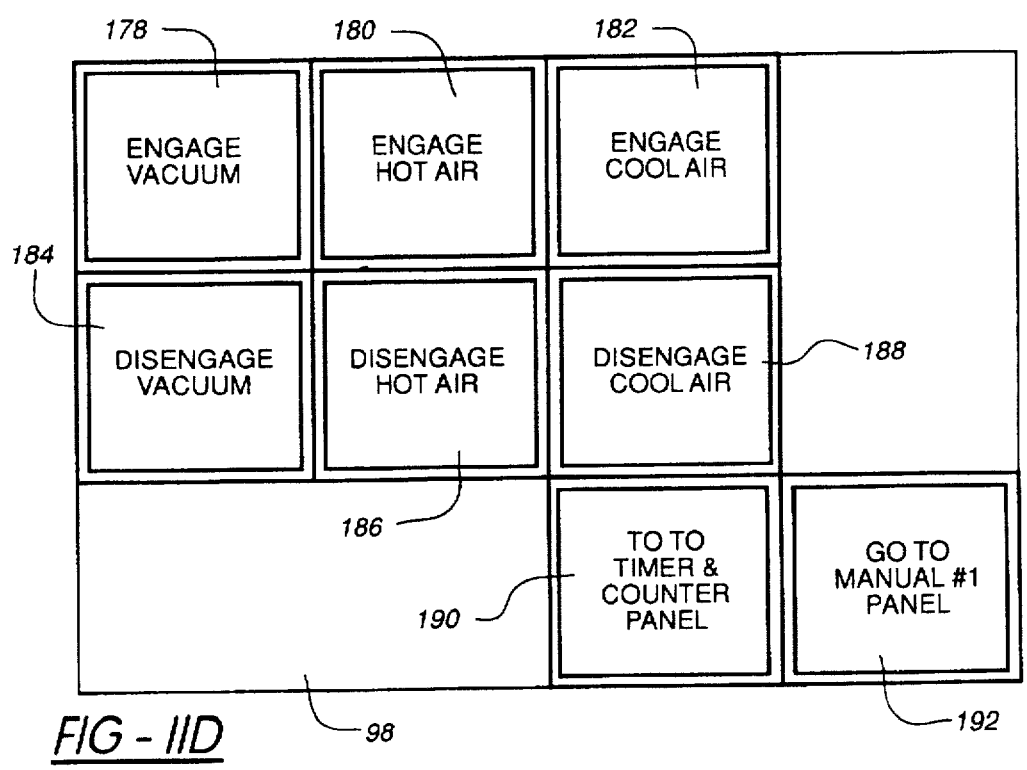

The Manual #2 panel display in the FIG. 11d has an engage vacuum push button softkey 178, an engage hot air push button softkey 180 and an engage cool air push button softkey 182 displayed in a top portion thereof. A disengage vacuum push button softkey 184, a disengage hot air push button softkey 186 and a disengage cool air push button softkey 188 are displayed in a middle portion thereof. A first change panel push button softkey 190 and a second change panel push button softkey 192 are positioned in a bottom portion of the panel display. The softkeys 178 and 184 are used by the operator to manually control the vacuum control 92 apply vacuum to and remove vacuum from respectively the tool 18. The softkeys 180 and 186 are used by the operator to manually control the heater 38 to apply hot air to and remove hot air from respectively the cushion 10. The softkeys 182 and 188 are used by the operator to manually control the air cooler 70 to apply cool air to and remove cool air from respectively the cushion 10. The first change panel push button softkey 190 permits the operator to switch the display to the Auto Vacuum panel display shown in the FIG. 11a and the second change panel push button softkey 192 permits the operator to switch the display to the Manual #1 panel display shown in the FIG. 11c.

The operator control panel 94 provides the operator with the means necessary to select between manual and automatic operation of the bonding assembly. The Auto Vacuum panel display shown in the FIG. 11a provides means for controlling the vacuum and the printer during automatic operation and provides displays for the temperature and the total cycle time. The Timer & Counter panel display shown in the FIG. 11b provides means for setting the hot air time, the cool air time, the vacuum time and the temperature and provides displays for the parts counter and the total cycle time. The Manual #1 panel display shown in the FIG. 11c provides means for the manual control of the movement of the compression plate 58, the plenum 34 and the tool 18. The Manual #2 panel display shown in the FIG. 11d provides means for the manual control of the application of the vacuum, the hot air and the cool air.

The cover layer of material 22 can be bonded over the undulating upper surface of the foam cushion 10 in accordance with an alternate method comprising a variation on the sequence of the steps described above. According to the alternate method, the tool 18 is first loaded with the cover 22 and the adhesive 82 by moving or pivoting the tool from the horizontal working position beneath the needles 44 to the loading position, as shown in the FIG. 7, with the working surface 20 thereof facing generally forwardly. While in this loading position, the operator spreads the cover 22 over the working surface 20 of the tool 18 with the finished side of the cover facing the working surface. The operator then places the adhesive 82 over the backside of the cover 22 and applies the vacuum pressure over the working surface 20 of the tool 18 to draw the cover against the working surface and make the cover smooth and free of wrinkles over the working surface. Once the tool 18 is loaded with the cover 22 and the adhesive 82, the process continues by moving the tool to the working position, as shown in the FIG. 2, although the cushion 10 is not yet present.

Next, the operator places the cushion 10 on the working surface 20, as shown in the FIG. 2, on top of the cover 22 and the adhesive 82 which were previously positioned on the tool 18. Then, the compression plate 58 is lowered to a compression position 59, as illustrated in the FIG. 6, to compress the cushion 10 and force ambient temperature air from the interior thereof. The plenum 32 is lowered piercing the cushion 10 with the plurality of needles 44 and the compression plate 58 is raised enough to release the compression, as illustrated in the FIG. 5, but maintain contact with the backside of the cushion. The forcing of the ambient temperature air from the interior of the cushion 10 makes it easier to eject the hot air from the needles 44 and into the cushion interior to elevate the temperature of the cushion, while maintaining a substantially equal mass flow rate of hot air through each of the needles. The cushion 10 is hot enough relative to the melting point of the adhesive 82 to cause the adhesive to melt in a very short time, that is, a short enough time period to prevent a quantity of heat transfer to the finished side of the cover 22 sufficient to cause degradation of the cover.

Once again, the compression plate 58 is lowered to the compression position 59 to compress and thereby force the hot air from the interior of the cushion 10. At the same time, the vacuum source 26 can be connected to the plenum 34 by a line 31 (FIG. 1) to pull the hot air from the cushion 10 through the needles 44. The ram 14 is actuated to perform the step of extracting the needles 44 from the cushion 10, as shown in the FIG. 6. The plenum 34 and the compression plate 58 are raised to the positions shown in the FIG. 2 and the tool 18 can be tilted to remove the cushion 10 with the cover 22 bonded thereto. This alternate method has the advantage of not requiring any cooling air.

The needles 44 can be approximately 0.125" in outside diameter and an exterior surface thereof can be coated with a friction reducing material such as a synthetic resin polymer sold under the trademark TEFLON to a thickness of approximately 0.010" to prevent damage to the cells in the foam cushion 10. As shown in the FIG. 8, the needle 44 has a plurality of ports 54 formed therein such as paired upper and lower ports which represent four pairs of such ports equally spaced about the needle. In the alternative, each pair of the ports 54 can be replaced by a single larger diameter port (providing the same mass flow) spaced approximately 0.040" above the start of the taper on the pointed end 56. The temperature of the heated air as it exits the ports 54 should be between 170° F. and 200° F. at a pressure of 2.5 to 10 psig at the inlet to the needle 44. Generally, the needles are positioned on approximately 2" centers to provide a mass flow rate of 0.5 to 2.5 cubic feet per minute.

Figure 12:
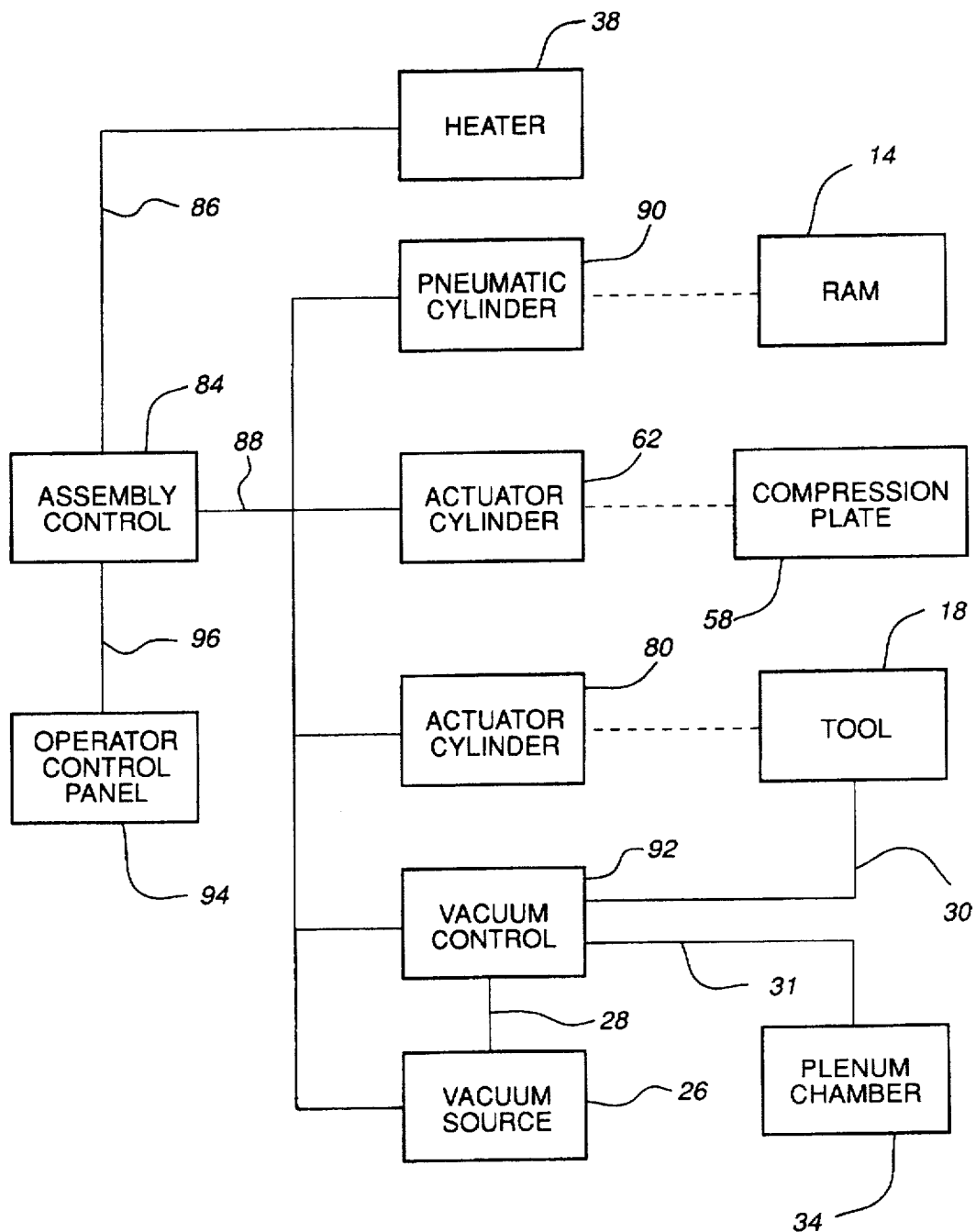
FIG. 12 is a schematic block diagram showing interconnections between the control system and the operating components of the bonding assembly shown in the FIG. 1 for performing the alternate method of bonding.

The assembly control means 84 also can be utilized to control the plurality of mechanisms in the bonding assembly to perform the alternate method described above with minor modifications. As shown in the FIG. 12, the tube 68 and the air cooler 70 (FIG. 9) have been replaced by the line 31 connecting the vacuum control 92 to the plenum chamber 34. In the FIG. 11a, the total cycle time display 140 can be deleted, since it also appears in the FIG. 11b, and the parts counter display 150 and the reset parts counter softkey 160 can be moved thereto from the FIG. 11b. In the FIG. 11b, the vacuum timer softkey 146 can be identified as the air manifold vacuum timer softkey and the temperature setpoint softkey 152 can be replaced by an air manifold temperature display. The following softkeys (not shown) can be added to the FIG. 11b: lower platen dwell; extend static air dwell; temperature functions; electronic regulator static air output; and electronic regulator % output. The temperature functions softkey switches the display to another panel (not shown) which includes a pyrometer temperature display, a bond line thermocouple temperature display (thermocouple 127), an air manifold temperature display, a timer display, an electronic regulator % output softkey and a timer & counters softkey (to return to the FIG. 11b). In the FIG. 11d, the engage vacuum softkey 178 can become an engage tool vacuum softkey and a similar engage manifold vacuum softkey can be added. The disengage vacuum softkey 184 can become a disengage tool vacuum softkey and a similar disengage manifold vacuum softkey can be added.

Figure 13:
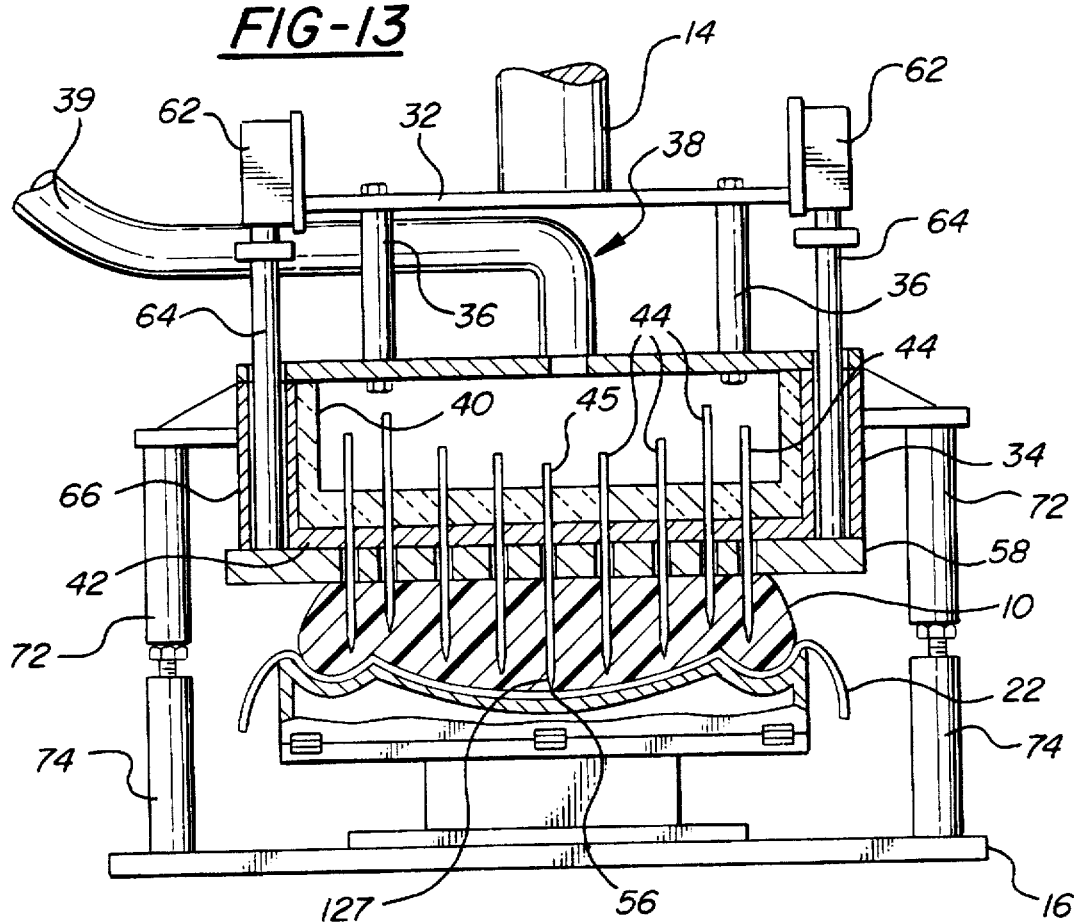
FIG. 13 is a view similar to the FIG. 5 but showing a temperature sensing needle at the bond line.

As stated above, the thermocouple 126 can be mounted in the plenum chamber 34 to generate the feedback signal to the input of the thermocouple module 116 in order to regulate the temperature of the heated air which is to be injected into the interior of the cushion 10. However, a more precise temperature control can be achieved by locating a thermocouple 127, similar to the thermocouple 126, in a tip of a temperature sensing needle 45 as shown in the FIG. 13. The needle 45 is positioned such that its tip 56 is adjacent the surface of the cushion 10 which is being bonded to the cover 22. Thus, a very accurate measure of the actual temperature at the bond line can be obtained and utilized as the feedback signal controlling the heater 38 and the temperature of the heated air. Although only one temperature sensing needle 45 is shown, other such needles can be provided at other positions in the cushion 10.

Figure 14:
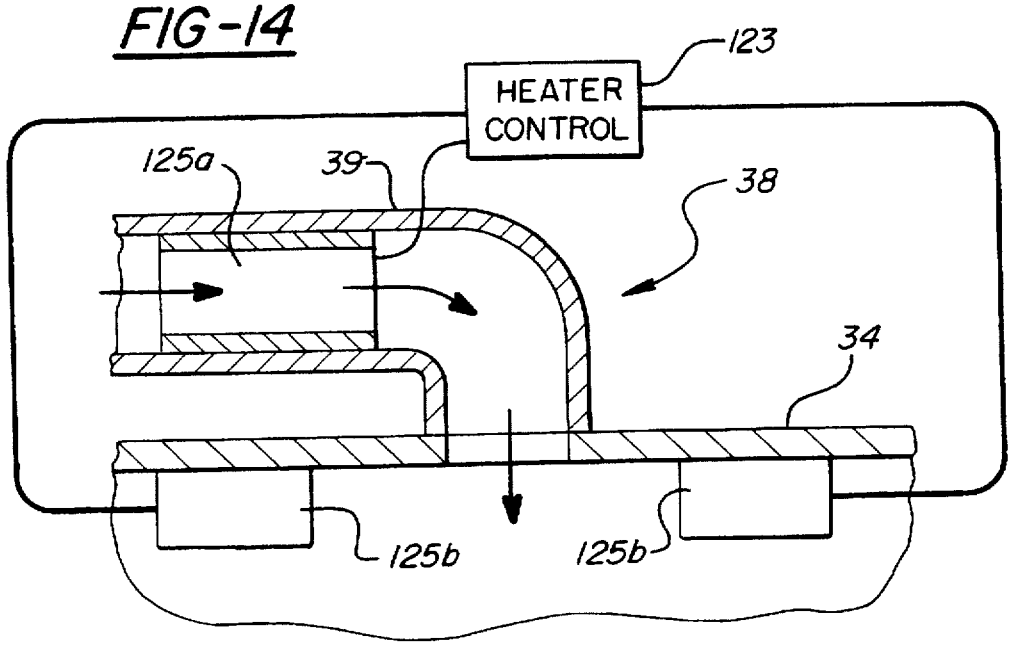
FIG. 14 is a fragmentary enlarged elevation view partially in cross section of the plenum chamber and heated air supply shown in the FIG. 13.

The heater 38 is shown in the FIG. 10 as including the flameless torch 124. However, an alternate form of the heating means 38 is shown in the FIG. 13 and the FIG. 14. The heater 38 includes a source of air such as a supply pipe 39 connected to the interior of the plenum chamber 34 through which air flows in the direction of the arrows. Positioned in the supply line 39 is a heater element 41 such as a tungsten electrical heater element 125a which replaces the torch 124 and past which the air flows. The line 39 can be provided with a plurality of the heater elements 125a spaced therealong connected to a suitable air heater control 123 which replaces the air heater control 122 shown in the FIG. 10. Additional, or alternative, heating can be provided by one or more tungsten electrical heater elements 125b positioned inside the plenum chamber 34 and connected to the control 123. Such heater elements are available from Osram Sylvania, Inc. of Exeter, N.H. under the tradename Hot Air Systems. The Osram elements combine serpentine element design, with dual sensors and a temperature controller (the control 123). One sensor senses the element temperature along the entire length of the heater and the other sensor senses the ambient temperature at the heater lead connections.

In summary, the apparatus for controlling the assembly for bonding the cover of material 22 over the surface of the foam cushion 10 with the adhesive material 82 includes the support structure 12, the ram 14 mounted on the support structure for vertical movement, the ram actuator cylinder 90 coupled to move the ram, the plenum chamber 34 attached to a lower end of the ram and having the plurality of hollow needles 44 extending downwardly therefrom in fluid communication with the plenum chamber, the source of air 39 in fluid communication with the plenum chamber, the air heater 125a,125b for heating the air, the pair of plate actuator cylinders 62 attached to the ram, the compression plate 58 positioned below the plenum chamber and attached to the plate actuator cylinders for vertical movement relative to the needles, the tool 18 hingedly mounted on the support structure, the tool actuator cylinder 80 attached to the support structure and the tool for tilting the tool between the working position and the loading position, and the vacuum source 26 in fluid communication 30,31 with the tool and the plenum chamber through the vacuum control 92.

The apparatus for controlling includes the operator control means 94 having the output 96 and being responsive to actuation by an operator for generating command signals at the output, the CPU module 106 connected to the bus 118 for generating bus signals, the input module 108 connected to the bus and having an input connected to the operator control means output for receiving the command signals and sending the command signals to the CPU module over the bus, the thermocouple 127 mounted in the temperature sensing needle 45 extending downwardly from the plenum chamber of the assembly for bonding for generating the feedback signal representing the actual temperature of air at the bond line between the cover 22 and the cushion 10 placed on the tool 18 of the assembly for bonding, the thermocouple module 116 connected to the bus and having an input connected to the thermocouple to receive the feedback signal and send the feedback signal to the CPU module over the bus, the heater control 123 connected to the bus and having an output adapted to be connected to the heater 125a,125b of air from the source of air 39 for generating the heater control signal for controlling the actual temperature of air in the plenum chamber, and the output module 114 connected to the bus and having an output connected to the ram actuator cylinder 90, the pair of plate actuator cylinders 62, the tool actuator cylinder 80 and the vacuum control 92 of the assembly for bonding, whereby the CPU module is responsive to the command signals and the feedback signal for generating bus signals over the bus to the heater control and to the output module, the heater control is responsive to the bus signals for generating the heater control signal and the output module is responsive to the bus signals for generating control signals at the output module output, the control signals including signals for controlling the ram actuator cylinder to raise and lower the plenum, the plate actuator cylinders to raise and lower the compression plate, the tool actuator cylinder to tilt the tool between a working position and a loading position and the vacuum control to supply vacuum to the tool and the plenum chamber thereby controlling the assembly for bonding to bond the cover to the cushion with the adhesive material.

The method of controlling the bonding assembly for bonding the cover layer 22 over the surface of the foam cushion 10 comprises the steps of: controlling a tool actuator cylinder to tilt a tool from a working position to a loading position while spreading a finished side of a cover over a working surface of the tool and placing an adhesive material on a backside of the cover; controlling a vacuum control to apply a vacuum pressure over the working surface of the tool to draw the cover against the working surface of the tool; controlling the tool actuator cylinder to return the tool to the working position after placing a foam cushion on the adhesive material; controlling a heater to heat air to a predetermined temperature range at which the adhesive material melts; and applying the heated air to an interior of the cushion to elevate a temperature of the cushion to melt the adhesive with the transfer of heat from the heated cushion and bond the cover to the cushion. The method further includes, prior to applying the heated air, controlling a ram actuator cylinder to move a plurality of hollow needles attached to a ram to pierce the cushion and wherein the step of applying the heated air is performed by forcing the heated air through the needles. The method also includes reading a feedback signal representing an actual temperature of the heated air at a bond line between the cushion and the cover and controlling the heater in response to a difference between the feedback signal and the predetermined temperature range, a step of controlling a plate actuator cylinder to move a compression plate against the cushion to force air from an interior of the cushion and a step of controlling a vacuum source to supply vacuum pressure to the needles to draw the heated air from the interior of the cushion to cure the adhesive material to thereby bond the cover to the cushion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for controlling an assembly for bonding a cover of material over the surface of a foam cushion with an adhesive material, the assembly for bonding including a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, a source of air in fluid communication with the plenum chamber, at least one plate actuator cylinder attached to the ram, a compression plate positioned below the plenum chamber and attached to the plate actuator cylinder for vertical movement relative to the needles, a tool hingedly mounted on the support structure, a tool actuator cylinder attached to the support structure and the tool for tilting the tool, and a vacuum source in fluid communication with the tool through a vacuum control, the apparatus for controlling comprising:

an assembly control means having an output adapted to be connected to the plate actuator cylinder of the assembly for bonding;

an operator control means having an output and being responsive to actuation by an operator for generating command signals at said output; and a CPU module in said assembly control means connected to receive said command signals from said operator control means, said CPU module being responsive to said command signals for generating control signals at said assembly control means output, said control signals including signals for controlling the plate actuator cylinder to raise and lower the compression plate of the assembly for bonding whereby the compression plate is lowered to a compression position to force air from an interior of a cushion placed on the tool of the assembly for bonding.

2. The apparatus according to claim 1 wherein the vacuum control of the assembly for bonding is connected between the vacuum source and the plenum chamber and said control signals include signals for controlling the vacuum control to draw air from an interior of a cushion placed on the tool of the assembly for bonding.

3. The apparatus according to claim 1 wherein said assembly control means includes a heater control connected to said CPU module and to at least one heater element positioned in the plenum chamber and said control signals include signals for controlling the heater control to heat air in the plenum chamber.

4. The apparatus according to claim 1 wherein the source of air includes a line in fluid communication with the plenum chamber, said assembly control means includes a heater control connected to said CPU module and to at least one heater element positioned in the line and said control signals include signals for controlling the heater control to heat air flowing through the line into the plenum chamber.

5. The apparatus according to claim 1 wherein said assembly control means includes a heater control connected to said CPU module and to at least one heater element, said control signals include signals for controlling the heater control to heat air supplied from the source of air to the plenum chamber, a thermocouple is connected to said assembly control means for generating a feedback signal representing an actual temperature of heated air at a bond line between a cover and a cushion placed on the tool of the assembly for bonding, and said assembly control means is responsive to said feedback signal for controlling a temperature of the heated air in the plenum chamber.

6. The apparatus according to claim 5 wherein said thermocouple is mounted on a temperature sensing needle extending downwardly from the plenum chamber.

7. An apparatus for controlling an assembly for bonding a cover of material over the surface of a foam cushion with an adhesive material, the assembly including a support structure, a ram mounted on the support structure for vertical movement, a ram actuator cylinder coupled to move the ram, a plenum chamber attached to a lower end of the ram and having a plurality of hollow needles extending downwardly therefrom in fluid communication with the plenum chamber, a source of air in fluid communication with the plenum chamber, a pair of plate actuator cylinders attached to the ram, a compression plate positioned below the plenum chamber and attached to the plate actuator cylinders for vertical movement relative to the needles, a tool hingedly mounted on the support structure, a tool actuator cylinder attached to the support structure and the tool for tilting the tool between a working position and a loading position, and a vacuum source in fluid communication with the tool and the plenum chamber through a vacuum control, the apparatus for controlling comprising:

an operator control means having an output and being responsive to actuation by an operator for generating command signals at said output;

a CPU module connected to a bus for generating bus signals;

an input module connected to said bus and having an input connected to said operator control means output for receiving said command signals and sending said command signals to said CPU module over said bus;

a thermocouple adapted to be mounted in a temperature sensing needle extending downwardly from the plenum chamber of the assembly for bonding for generating a feedback signal representing an actual temperature of air at a bond line between a cover and a cushion placed on the tool of the assembly for bonding;

a thermocouple module connected to said bus and having an input connected to said thermocouple to receive said feedback signal and send said feedback signal to said CPU module over said bus;

a heater control connected to said bus and having an output adapted to be connected to a heater of air from the source of air for generating a heater control signal for controlling the actual temperature of air in the plenum chamber; and an output module connected to said bus and having an output adapted to be connected to the ram actuator cylinder, the pair of plate actuator cylinders, the tool actuator cylinder and the vacuum control of the assembly for bonding, whereby said CPU module is responsive to said command signals and said feedback signal for generating bus signals over said bus to said heater control and to said output module, said heater control is responsive to said bus signals for generating said heater control signal and said output module is responsive to said bus signals for generating control signals at said output module output, said control signals including signals for controlling the ram actuator cylinder to raise and lower the plenum, the plate actuator cylinders to raise and lower the compression plate, the tool actuator cylinder to tilt the tool between a working position and a loading position and the vacuum control to supply vacuum to the tool and the plenum chamber thereby controlling the assembly for bonding to bond a cover to a cushion with an adhesive material.

8. A method of controlling a bonding assembly for bonding a cover layer of material over the surface of a foam cushion comprising the steps of:

a. controlling a tool actuator cylinder to tilt a tool from a working position to a loading position while spreading a finished side of a cover over a working surface of the tool and placing an adhesive material on a backside of the cover;

b. controlling a vacuum control to apply a vacuum pressure over the working surface of the tool to draw the cover against the working surface of the tool;

c. controlling the tool actuator cylinder to return the tool to the working position after placing a foam cushion on the adhesive material;

d. controlling a heater to heat air to a predetermined temperature range at which the adhesive material melts; and e. applying the heated air to an interior of the cushion to elevate a temperature of the cushion to melt the adhesive with the transfer of heat from the heated cushion and bond the cover to the cushion.

9. The method according to claim 8 including prior to said step e. controlling a ram actuator cylinder to move a plurality of hollow needles attached to a ram to pierce the cushion and wherein said step e. is performed by forcing the heated air through the needles.

10. The method according to claim 8 where the step d. includes reading a feedback signal representing an actual temperature of the heated air at a bond line between the cushion and the cover and controlling the heater in response to a difference between the feedback signal and the predetermined temperature range.

11. The method according to claim 8 including a step of controlling a plate actuator cylinder to move a compression plate against the cushion to force air from an interior of the cushion.

12. The method according to claim 8 including a step of controlling a vacuum source to supply vacuum pressure to the needles to draw the heated air from the interior of the cushion to cure the adhesive material to thereby bond the cover to the cushion.

* * * * *